United States Patent
Wang

(10) Patent No.: US 9,030,624 B2
(45) Date of Patent: May 12, 2015

(54) DIRECT BACKLIGHT MODULE AND LIQUID DISPLAY WITH THE SAME

(71) Applicant: Shenzhen China Star Optoelectronics Technology Co., Ltd., Shenzhen, Guangdong (CN)

(72) Inventor: Jiaqiang Wang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 329 days.

(21) Appl. No.: 13/703,682

(22) PCT Filed: Nov. 28, 2012

(86) PCT No.: PCT/CN2012/085411
§ 371 (c)(1),
(2) Date: Dec. 12, 2012

(87) PCT Pub. No.: WO2014/075357
PCT Pub. Date: May 22, 2014

(65) Prior Publication Data
US 2014/0139780 A1    May 22, 2014

(30) Foreign Application Priority Data
Nov. 16, 2012 (CN) .......................... 2012 1 0463142

(51) Int. Cl.
*G02F 1/1333* (2006.01)
*G02F 1/1335* (2006.01)

(52) U.S. Cl.
CPC .... *G02F 1/133608* (2013.01); *G02F 1/133603* (2013.01); *G02F 2203/68* (2013.01)

(58) Field of Classification Search
USPC .......................................................... 349/58
See application file for complete search history.

(56) References Cited

U.S. PATENT DOCUMENTS

2009/0009679 A1* 1/2009 Ke et al. ............................ 349/58
2012/0127391 A1* 5/2012 Ahn et al. ......................... 349/58

* cited by examiner

*Primary Examiner* — Lucy Chien
(74) *Attorney, Agent, or Firm* — Andrew C. Cheng

(57) ABSTRACT

A direct backlight module is disclosed. The direct backlight module includes: a backplane comprising a detachable sheet and a fixing sheet, and the detachable sheet connects to the fixing sheet; a direct light source arranged on the detachable sheet; an optical film set arranged on the direct light source, the optical film set faces toward a light emitting surface of the direct light source; and a liquid crystal panel arranged on the optical film set. In addition, a liquid crystal display includes the above direct backlight module is also disclosed. The assembly or maintaining process of the direct backlight module is convenient. In addition, the heat dissipation of the direct backlight module is also enhanced.

20 Claims, 2 Drawing Sheets

DIRECT BACKLIGHT MODULE AND LIQUID DISPLAY WITH THE SAME

BACKGROUND OF THE INVENTION

This application claims priority to China Patent Application No. 201210463142.2 filed on Nov. 16, 2012 entitled, DIRECT BACKLIGHT MODULE AND LIQUID CRYSTAL DISPLAY WITH THE SAME, all of the disclosures of which are incorporated herein by reference in their entirety.

FIELD OF THE INVENTION

Embodiments of the present disclosure relate to Thin Film Transistor Liquid Crystal Display (TFT-LCD) technology, and more particularly to a direct backlight module and a liquid display device with the same.

DISCUSSION OF THE RELATED ART

Most of the TFT-LCD adopts light emitting diode (LED) as a light source as the LED possesses the energy-efficient attribute.

FIG. 1 is a schematic view of a typical direct backlight module. The backlight module includes a backplane 1, a plurality of direct light sources 2 arranged on the backplane 1, and an optical film set 3. The direct light sources 2 are LEDs. The light emitted from the direct light sources 2 is directly toward the optical film set 3. In addition, the direct backlight module further includes a liquid crystal panel 4, a plastic frame 5 and a front frame 6.

However, the assembly process of the above components of the typical backlight module is complex. In addition, it is difficult to re-assemble or fix the light source under the typical structure as a plurality of components has to be disassembled.

SUMMARY

The object of the claimed invention is to provide a direct backlight module and a liquid display device with the same.

In one aspect, a direct backlight module includes: a backplane comprising a detachable sheet and a fixing sheet, and the detachable sheet connects to the fixing sheet; a direct light source arranged on the detachable sheet; an optical film set arranged on the direct light source, the optical film set faces toward a light emitting surface of the direct light source; and a liquid crystal panel arranged on the optical film set.

Wherein the direct backlight module further includes: a plastic frame arranged on an external side of a bottom sheet of the fixing sheet, and the plastic frame covers a rim of the optical film set; and a front frame is for fixing the liquid crystal panel and the plastic frame.

Wherein the fixing sheet of the backplane further comprises a vertical sheet, the bottom sheet extends from the vertical sheet, the vertical sheet is vertical to the bottom sheet, and wherein the detachable sheet connects to an edge portion of the bottom sheet of the fixing sheet.

Wherein the detachable sheet is made of high heat-conductive materials.

Wherein the detachable sheet and the edge portion of the bottom sheet of the fixing sheet are connected via a screw.

Wherein the edge portion of the bottom sheet of the fixing sheet comprises a mismatch portion, the detachable sheet is arranged below the mismatch portion and is parallel to other portions of the bottom sheet of the fixing sheet, and the mismatch portion of the bottom sheet of the fixing sheet connects to the detachable sheet via a screw.

Wherein the edge portion of the bottom sheet of the fixing sheet comprises a slot with a U-shaped cross section, one end of the detachable sheet is clasped in the slot, and the slot connects to the edge portion of the bottom sheet via a screw.

Wherein the edge portion of the bottom sheet of the fixing sheet comprises an integrally formed slot with a U-shaped cross section, and one end of the detachable sheet is clasped in the slot.

Wherein the direct light source comprises a plurality of LEDs or a LED light bar uniformly arranged on the detachable sheet of the backplane.

Wherein the direct light source comprises a plurality of LEDs or a LED light bar uniformly arranged on the detachable sheet of the backplane.

Wherein the direct light source comprises a plurality of LEDs or a LED light bar uniformly arranged on the detachable sheet of the backplane.

Wherein the direct light source comprises a plurality of LEDs or a LED light bar uniformly arranged on the detachable sheet of the backplane.

In another aspect, a direct backlight module includes: a backplane comprising a detachable sheet and a fixing sheet, the fixing sheet comprises a vertical sheet and a bottom sheet extending from the vertical sheet, the vertical sheet is vertical to the bottom sheet, the detachable sheet connects to an edge portion of the bottom sheet of the fixing sheet, and the detachable sheet is made of high heat-conductive materials; a direct light source arranged on the detachable sheet; an optical film set arranged on the direct light source, the optical film set faces toward a light emitting surface of the direct light source; and a liquid crystal panel arranged on the optical film set.

Wherein the direct backlight module further includes: a plastic frame arranged on an external side of the bottom sheet of the fixing sheet, and the plastic frame covers a rim of the optical film set; and a front frame is for fixing the liquid crystal panel and the plastic frame.

Wherein the detachable sheet and the edge portion of the bottom sheet of the fixing sheet are connected via a screw.

Wherein the edge portion of the bottom sheet of the fixing sheet comprises a mismatch portion, the detachable sheet is arranged below the mismatch portion and is parallel to other portions of the bottom sheet of the fixing sheet, and the mismatch portion of the bottom sheet of the fixing sheet connects to the detachable sheet via a screw.

Wherein the edge portion of the bottom sheet of the fixing sheet comprises a slot with a U-shaped cross section, one end of the detachable sheet is clasped in the slot, and the slot connects to the edge portion of the bottom sheet via a screw.

Wherein the edge portion of the bottom sheet of the fixing sheet comprises an integrally formed slot with a U-shaped cross section, and one end of the detachable sheet is clasped in the slot.

Wherein the direct light source comprises a plurality of LEDs or a LED light bar uniformly arranged on the detachable sheet of the backplane.

In another aspect, a liquid crystal display includes the direct backlight module as claimed in claim 13.

DETAILED DESCRIPTION OF THE EMBODIMENTS

Embodiments of the invention will now be described more fully hereinafter with reference to the accompanying drawings, in which embodiments of the invention are shown.

Figure 1:
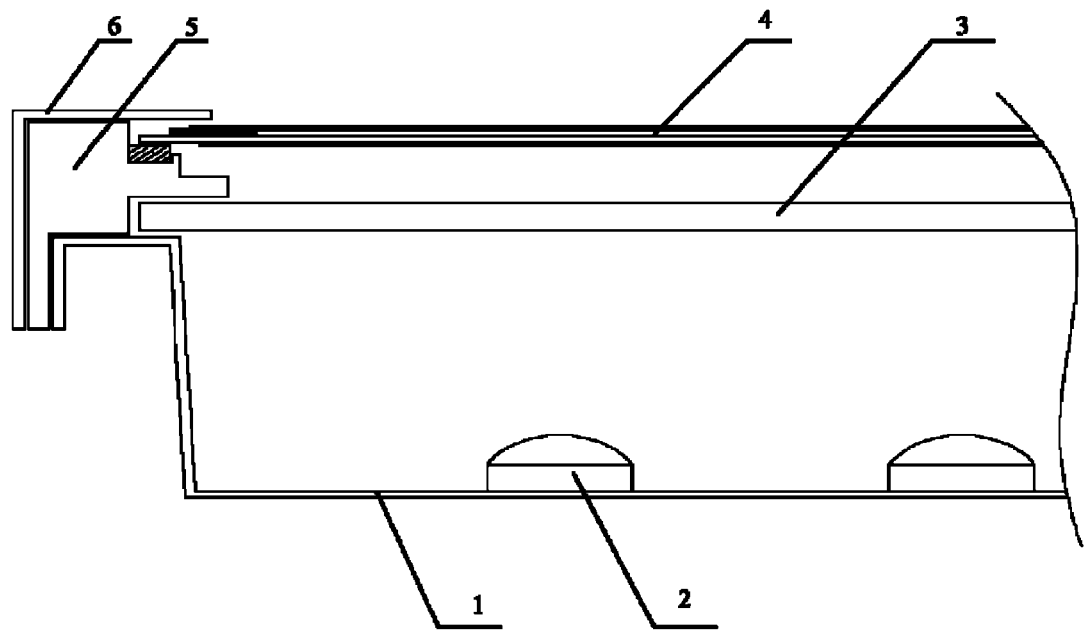
FIG. 1 is a schematic view of a typical direct backlight module.
Figure 2:
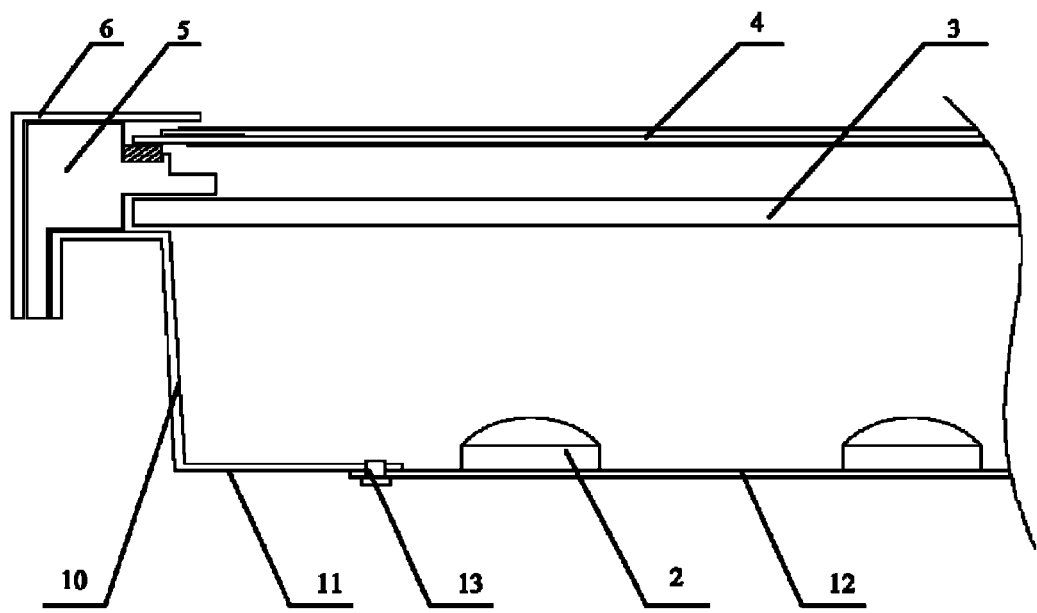
FIG. 2 is a schematic view of a direct backlight module in accordance with a first embodiment.

FIG. 2 is a schematic view of a direct backlight module in accordance with a first embodiment. The direct backlight module includes a backplane, a direct light source 2, an optical film set 3, and a liquid crystal panel 4.

The backplane includes a detachable sheet 12 and a fixing sheet. The fixing sheet includes a vertical sheet 10 and a bottom sheet 11 extending from the vertical sheet 10. The vertical sheet 10 is vertical to the bottom sheet 11. The detachable sheet 12 connects to an edge portion of the bottom sheet 11 of the fixing sheet.

The direct light source 2 is arranged on the detachable sheet 12. Specifically, the direct light source 2 includes a plurality of LEDs or a LED light bar uniformly arranged on the detachable sheet 12. The LEDs may be directly arranged on the detachable sheet 12. In other embodiments, the LEDs may be arranged on a printed circuit board (PCB) on the detachable sheet 12.

The optical film set 3 is arranged on the direct light source 2. Specifically, the optical film set 3 faces toward a light emitting surface of the direct light source 2. The optical film set 3 includes at least one optical films, such as a diffusing sheet or a prism sheet. As such, the lights emitted from the direct light source 2 are uniformly distributed after the lights pass through the optical film set 3.

The liquid crystal panel 4 is arranged on the optical film set 3. The liquid crystal panel 4 includes at least a liquid crystal glass.

In one embodiment, the direct backlight module further includes a plastic frame 5, and a front frame 6. The plastic frame 5 is arranged on an external side of the vertical sheet 10 of the bottom sheet. In addition, the plastic frame 5 covers a rim of the optical film set 3. The front frame 6 is arranged on an external side of the plastic frame 5 and is for fixing the liquid crystal panel 4 and the plastic frame 5.

As shown in FIG. 2, the detachable sheet 12 and the edge portion of the bottom sheet 11 of the fixing sheet are connected via a screw 13.

Figure 3:
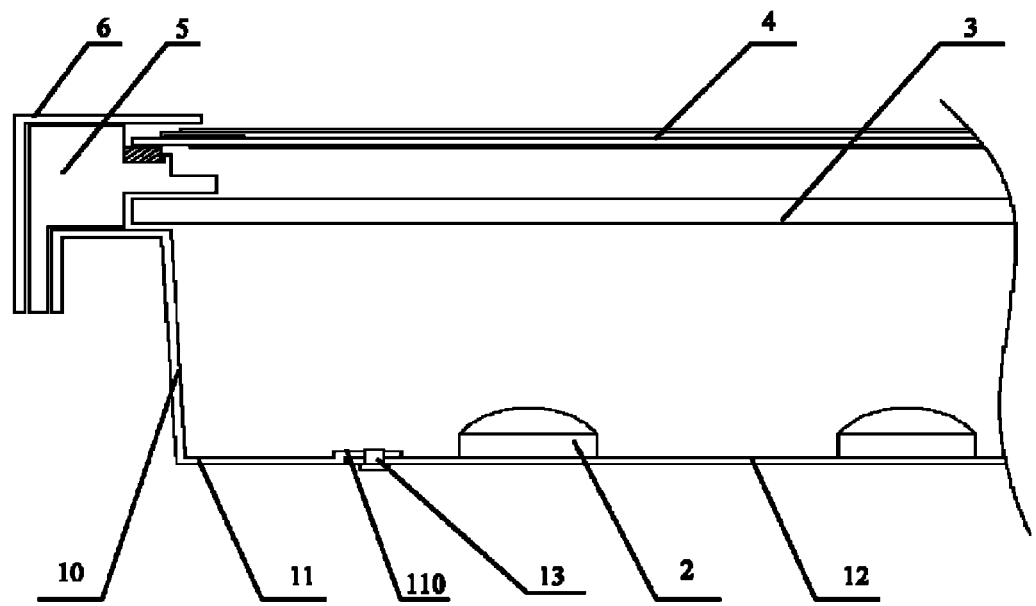
FIG. 3 is a schematic view of a direct backlight module in accordance with a second embodiment.

FIG. 3 is a schematic view of a direct backlight module in accordance with a second embodiment. In the embodiment, the edge portion of the bottom sheet 11 of the fixing sheet bends upward to form a mismatch portion 110. The mismatch portion 110 is substantially parallel to other portions of the bottom sheet 11. The edge portion of the detachable sheet 12 is arranged below the mismatch portion 110, and is parallel to other portions of the bottom sheet 11 of the fixing sheet. The mismatch portion 110 of the bottom sheet 11 of the fixing sheet connects to the detachable sheet 12 via the screw 13.

Figure 4:
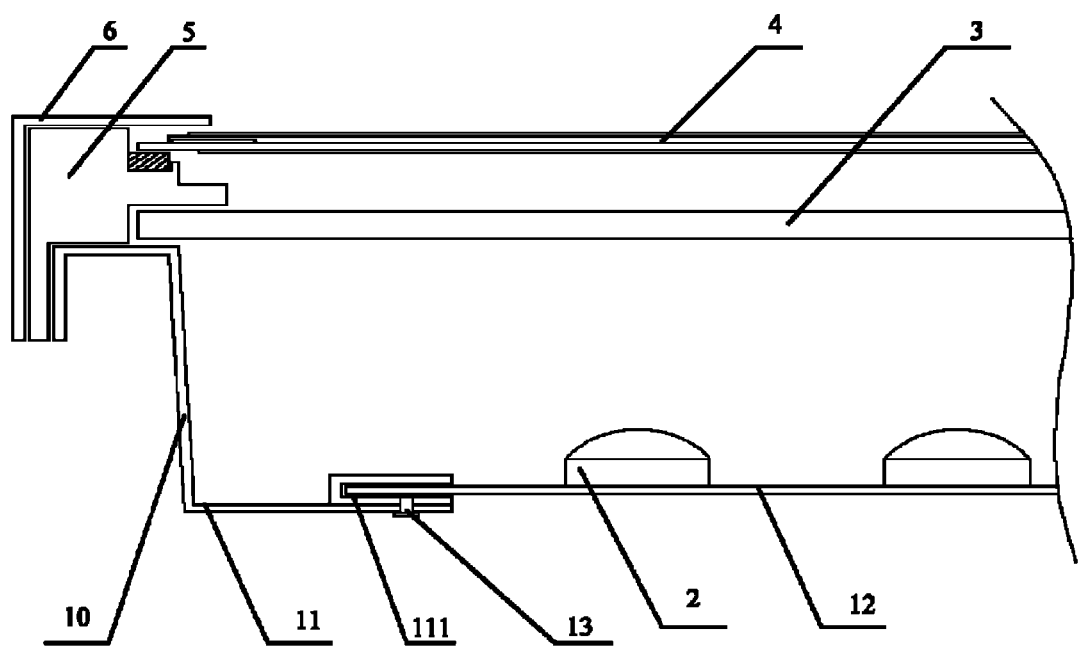
FIG. 4 is a schematic view of a direct backlight module in accordance with a third embodiment.

FIG. 4 is a schematic view of a direct backlight module in accordance with a third embodiment. In the third embodiment, the edge portion of the bottom sheet 11 includes a slot 111 with a U-shaped cross section. One end of the detachable sheet 12 is clasped in the slot 111. The slot 111 connects to the edge portion of the bottom sheet 11 via the screw 13.

In other embodiments, the slot 111 may be integrally formed with the bottom sheet 11 of the fixing sheet. That is, the edge portion of the bottom sheet 11 is formed with the slot 111, and the slot 111 has the U-shaped cross section. And one edge of the detachable sheet 12 is clasped in the slot 111.

In the above embodiments, the detachable sheet is made of high heat-conductive materials, such as aluminum, copper, aluminum alloy, to enhance the heat dissipation of the backlight module.

In one embodiment, a liquid crystal display includes the direct backlight module in the above embodiments.

In view of the above, as the direct backlight module is arranged on the detachable sheet, the assembly process of the direct backlight module is more convenient. Specifically, the direct light source can be easily maintained by detaching the detachable sheet.

In addition, as the detachable sheet is made of high heat-conductive material, the heat dissipation of the backlight module is enhanced. Furthermore, as the detachable sheet is only part of the backplane, the cost of adopting the high heat-conductive material is therefore reduced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A direct backlight module, comprising:
    a backplane comprising a detachable sheet and a fixing sheet, and the detachable sheet connects to the fixing sheet;
    a direct light source arranged on the detachable sheet;
    an optical film set arranged on the direct light source, the optical film set faces toward a light emitting surface of the direct light source; and
    a liquid crystal panel arranged on the optical film set;
    a plastic frame arranged on an external side of a bottom sheet of the fixing sheet, and the plastic frame covers a rim of the optical film set; and
    wherein an edge portion of the bottom sheet of the fixing sheet comprises a slot with a U-shaped cross section.

2. The direct backlight module as claimed in claim 1, wherein the direct backlight module further comprises:
    a front frame for fixing the liquid crystal panel and the plastic frame.

3. The direct backlight module as claimed in claim 2, wherein the fixing sheet of the backplane further comprises a vertical sheet, the bottom sheet extends from the vertical sheet, the vertical sheet is vertical to the bottom sheet, and wherein the detachable sheet connects to an edge portion of the bottom sheet of the fixing sheet.

4. The direct backlight module as claimed in claim 3, wherein the detachable sheet is made of high heat-conductive materials.

5. The direct backlight module as claimed in claim 4, wherein the detachable sheet and the edge portion of the bottom sheet of the fixing sheet are connected via a screw.

6. The direct backlight module as claimed in claim 4, wherein the edge portion of the bottom sheet of the fixing sheet comprises a mismatch portion, the detachable sheet is arranged below the mismatch portion and is parallel to other portions of the bottom sheet of the fixing sheet, and the mismatch portion of the bottom sheet of the fixing sheet connects to the detachable sheet via a screw.

7. The direct backlight module as claimed in claim 4, wherein one end of the detachable sheet is clasped in the slot, and the slot connects to the edge portion of the bottom sheet via a screw.

8. The direct backlight module as claimed in claim 4, wherein the slot of the edge portion of the bottom sheet of the fixing sheet is integrally formed slot, and one end of the detachable sheet is clasped in the slot.

9. The direct backlight module as claimed in claim 5, wherein the direct light source comprises a plurality of LEDs or a LED light bar uniformly arranged on the detachable sheet of the backplane.

10. The direct backlight module as claimed in claim 6, wherein the direct light source comprises a plurality of LEDs or a LED light bar uniformly arranged on the detachable sheet of the backplane.

11. The direct backlight module as claimed in claim 7, wherein the direct light source comprises a plurality of LEDs or a LED light bar uniformly arranged on the detachable sheet of the backplane.

12. The direct backlight module as claimed in claim 8, wherein the direct light source comprises a plurality of LEDs or a LED light bar uniformly arranged on the detachable sheet of the backplane.

13. A direct backlight module, comprising:
a backplane comprising a detachable sheet and a fixing sheet, the fixing sheet comprises a vertical sheet and a bottom sheet extending from the vertical sheet, the vertical sheet is vertical to the bottom sheet, the detachable sheet connects to an edge portion of the bottom sheet of the fixing sheet, and the detachable sheet is made of high heat-conductive materials;
a direct light source arranged on the detachable sheet;
an optical film set arranged on the direct light source, the optical film set faces toward a light emitting surface of the direct light source; and
a liquid crystal panel arranged on the optical film set;
a plastic frame arranged on an external side of a bottom sheet of the fixing sheet, and the plastic frame covers a rim of the optical film set; and
wherein an edge portion of the bottom sheet of the fixing sheet comprises a slot with a U-shaped cross section.

14. The direct backlight module as claimed in claim 13, wherein the direct backlight module further comprises:
a front frame for fixing the liquid crystal panel and the plastic frame.

15. The direct backlight module as claimed in claim 14, wherein the detachable sheet and the edge portion of the bottom sheet of the fixing sheet are connected via a screw.

16. The direct backlight module as claimed in claim 14, wherein the edge portion of the bottom sheet of the fixing sheet comprises a mismatch portion, the detachable sheet is arranged below the mismatch portion and is parallel to other portions of the bottom sheet of the fixing sheet, and the mismatch portion of the bottom sheet of the fixing sheet connects to the detachable sheet via a screw.

17. The direct backlight module as claimed in claim 14, wherein one end of the detachable sheet is clasped in the slot, and the slot connects to the edge portion of the bottom sheet via a screw.

18. the direct backlight module as claimed in claim 14, wherein the slot of the edge portion of the bottom sheet of the fixing sheet is integrally formed slot, and one end of the detachable sheet is clasped in the slot.

19. The direct backlight module as claimed in claim 14, wherein the direct light source comprises a plurality of LEDs or a LED light bar uniformly arranged on the detachable sheet of the backplane.

20. A liquid crystal display comprises the direct backlight module as claimed in claim 13.

* * * * *